United States Patent [19]
Frusti et al.

[11] Patent Number: 5,683,133
[45] Date of Patent: Nov. 4, 1997

[54] THEFT PREVENTION FEATURE USING POWER DRIVER SEAT

[75] Inventors: Thomas M. Frusti, Canton; David J. Hoffman, Westland, both of Mich.

[73] Assignee: Ford Global Technologies, Inc., Dearborn, Mich.

[21] Appl. No.: 553,739

[22] Filed: Oct. 23, 1995

[51] Int. Cl.$^6$ ................................................. B60N 2/12
[52] U.S. Cl. ................................. 296/65.1; 180/287
[58] Field of Search .......................... 296/65.1; 297/341; 180/287

[56] References Cited

U.S. PATENT DOCUMENTS

| | | | |
|---|---|---|---|
| 5,179,328 | 1/1993 | Furuse et al. | 180/287 |
| 5,213,388 | 5/1993 | Baker. | |
| 5,251,465 | 10/1993 | Hwang. | |
| 5,412,964 | 5/1995 | Yee. | |
| 5,415,458 | 5/1995 | Kim. | |
| 5,519,260 | 5/1996 | Washington | 180/287 |
| 5,529,372 | 6/1996 | Cohen | 297/341 |

FOREIGN PATENT DOCUMENTS

| | | | |
|---|---|---|---|
| 2587663 | 3/1987 | France | 180/287 |
| 166621 | 7/1988 | Japan | 296/65.1 |
| 4-66350 | 3/1992 | Japan. | |

*Primary Examiner*—Gary C. Hoge
*Attorney, Agent, or Firm*—Roger L. May

[57] ABSTRACT

A vehicle anti-theft system for an automotive vehicle positions the driver seat of the vehicle in an undriveable position. The system includes a seat having a seat back and a seat base both of which have a fore and aft position. A first motor is operatively coupled to the seat back for moving the seat back between the fore and aft position. A second motor is operatively coupled to the seat base for moving the seat base between the fore and aft position. An input device generates an activation signal. A controller is connected to the first motor, the second motor, the input device and a power source. The controller upon receiving the activation signal connects the power source to the first motor and second motor whereby the first motor moves the seat back to the fore position and the second motor moves the seat base to the fore position.

17 Claims, 3 Drawing Sheets

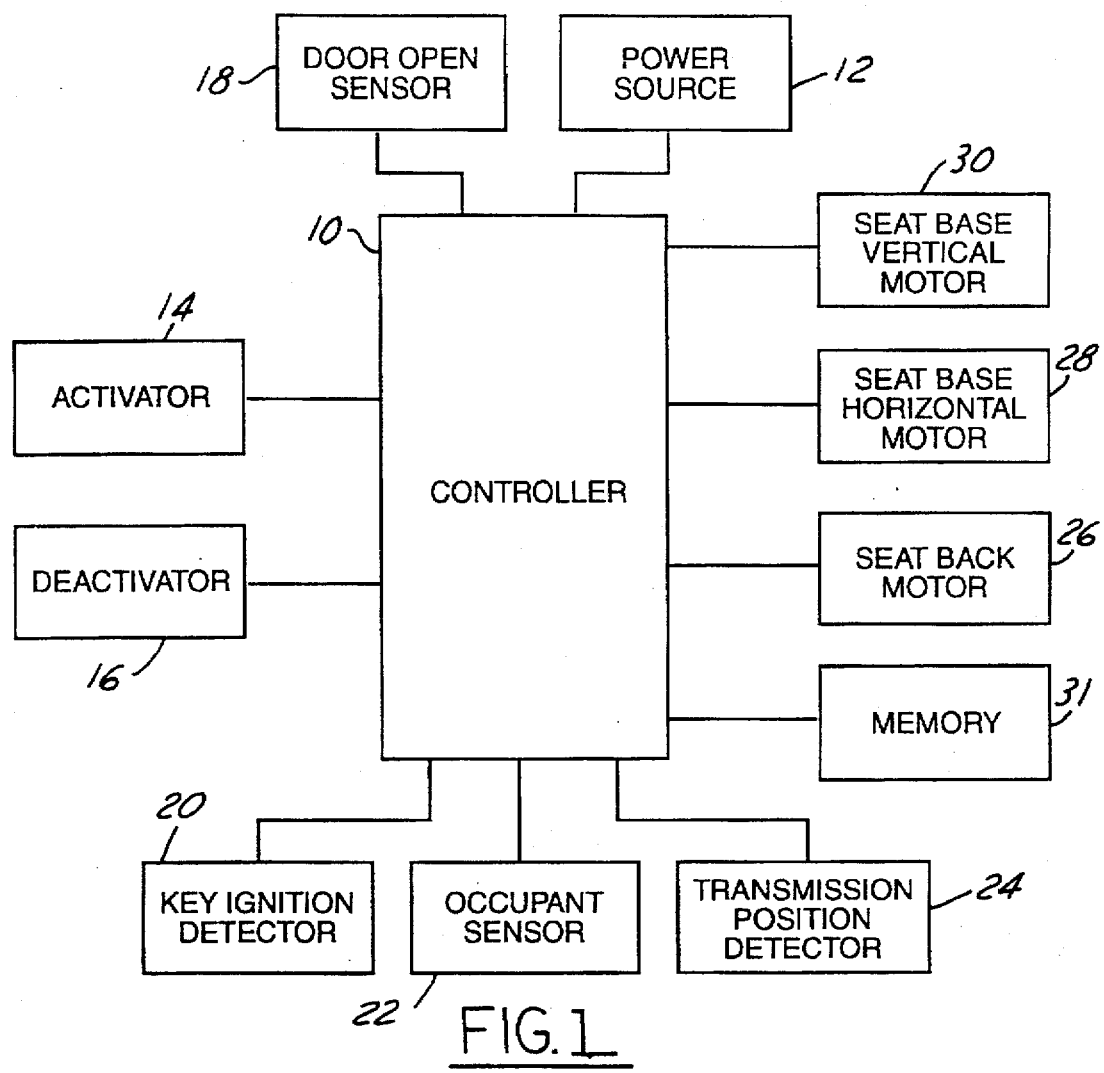
FIG. 1
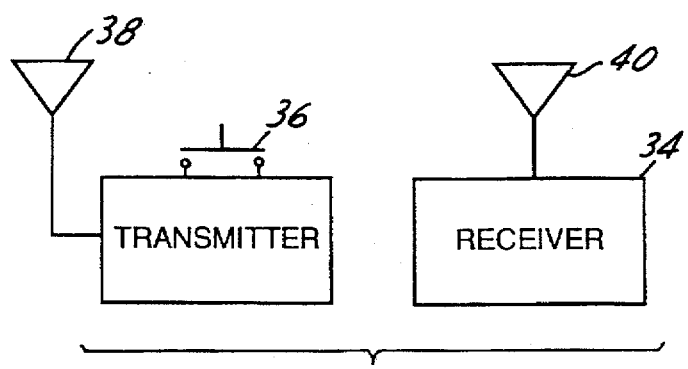
FIG. 2
| 1 | 2 | 3 | 4 | 5 | 6 | 7 | 8 | 9 | 0 |
FIG. 3

THEFT PREVENTION FEATURE USING POWER DRIVER SEAT

FIELD OF THE INVENTION

The present invention relates generally to an anti-theft system for an automotive vehicle, and more specifically, to moving a driver seat to a position rendering the vehicle undriveable.

BACKGROUND OF THE INVENTION

Several automobile anti-theft systems are know for disabling an automobile. Many add several components to vehicles such as disabling switches. Others are purely mechanical in nature such a locking bar which limits travel of the steering wheel.

One disadvantage of prior systems is that mechanical devices typically fall into disuse because of inconvenience. Several are also easily defeatable and provide little deterrence to experienced unauthorized users.

U.S. Pat. No. 5,213,388 describes a seat system that has a double sliding track assembly, i.e., an upper track and a lower track. The utility of the patent depends on the ability to lock the upper track assembly to the lower track assembly. One disadvantage to this system is the ability to reach the seat bolts and remove the seat rendering the vehicle driveable.

SUMMARY OF THE INVENTION

The present invention overcomes the disadvantages of the related art by providing an anti-theft system using components commonly found in many vehicles. The components are combined in a new and useful way to provide a low cost disabling feature for an automotive vehicle.

The present invention includes a seat having a seat back and a seat base, each of the seat back and the seat base having a fore and aft position. A first motor is operatively coupled to the seat back for moving the seat back between the fore and aft position. A second motor is operatively coupled to the seat base for moving the seat base between the fore and aft position. An input device generates an activation signal. A controller is connected to the first motor and the second motor, the input device and a power source. The controller upon receiving the activation signal connects the power source to the first motor and second motor whereby the first motor moves the seat back to the fore position and the second motor moves the seat base to the fore position.

An advantage of the present invention is that the mounting bolts of the seat can be placed in a location that is not accessible when the seat is in its forward most position.

BRIEF DESCRIPTION OF THE DRAWINGS

These and other advantages of the present invention will be apparent to those skilled in the art upon reading the following description with reference to the accompanying drawings, in which:

FIG. 1 is a block diagram of an anti-theft system according to the present invention.

FIG. 2 is an activator device.

FIG. 3 is an alternate activator device.

DETAILED DESCRIPTION OF THE PREFERRED EMBODIMENT

Figure 4:
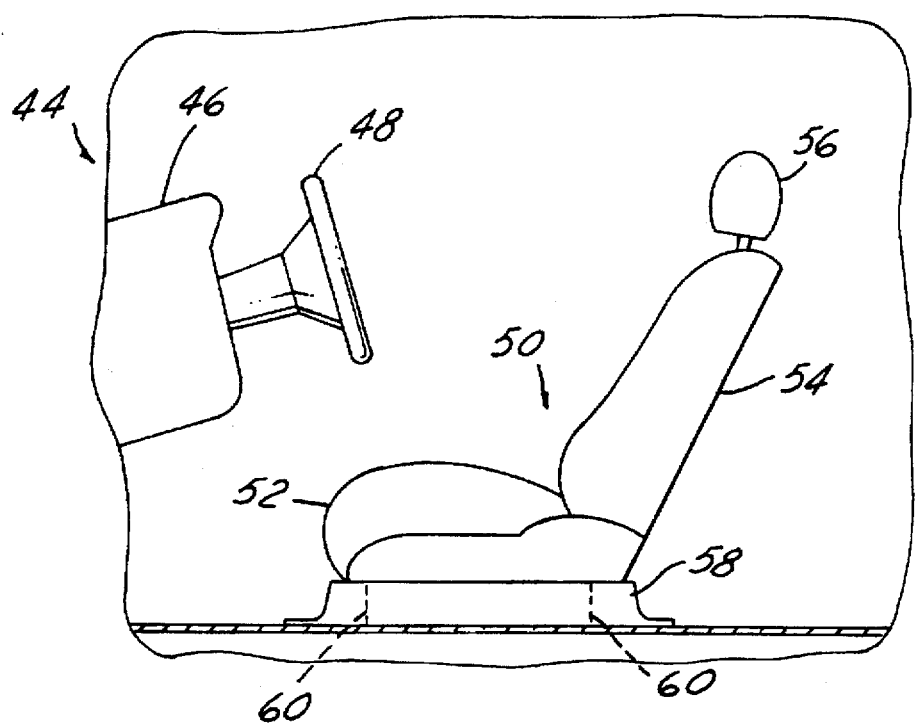
FIG. 4 is a seat in the aft position.

Referring to FIG. 1, controller 10 is preferably a microprocessor-based system and has several inputs, several outputs and a power source 12. An activator 14, a deactivator 16, a door open sensor 18, a key-in ignition detector 20, an occupant sensor 22, and a transmission position detector 24 are inputs to the controller. Based on the inputs, controller 10 controls the movement of a seat in an automotive vehicle to put the driver seat in an undriveable position. Controller 10 outputs an output signal to a seat back motor 26, a seat base horizontal motor 28, and a seat base vertical motor 30. Based on the inputs to controller 10, the seat is positioned in an undriveable position. Preferably, controller 10 automatically positions the seat of the automotive vehicle to an undriveable position with little or no input from the vehicle operator.

Power source 12 is preferably a conventional automotive power source. Typically, power source 12 would be a twelve-volt power supply. Door open sensor 18 provides a signal to controller 10 if the driver side door, or any of he vehicle doors, are in the open position. One way in which the door open sensor may be implemented is an active low switch that, when the door is open, connects a ground signal to controller 10. Various methods of implementing an input to controller 10 would be evident to those skilled in the art.

Key-in ignition detector 20 provides an output signal to controller 10 based on the presence of a key within an ignition lock. An occupant sensor 22 provides controller 10 with information as to whether an occupant is in a seat of the automotive vehicle, i.e., an occupant or no-occupant signal. Occupant sensor 22 may take several forms. For example, a simple weight activated sensor may be used. Further, an infrared type sensor may also be used.

A transmission position detector 24 provides information to controller 10 as to the position of the shift lever of the transmission. For the present invention, whether the transmission is either in "park" or "not in park" is the relevant information.

If the anti-theft position is desired based on the inputs to controller 10, various motor commands are issued by controller 10 to control the movement of the driver seat of the automotive vehicle. In the anti-theft position, the seat is preferably placed in its forwardmost position. This is accomplished by moving seat back motor 26, seat base horizontal motor 28, and seat base vertical motor 30. These motors are typically used in automotive vehicles to control the power seat function. Seat back motor 26, seat base horizontal motor 28, and seat base vertical motor 30 are preferably of the type to exert a sufficient holding torque to prevent the movement of the seat when disconnected from a power source 12. For example, the motor can be a permanent magnet motor.

However, controller 10 may override any power seat function to position the seat in the anti-theft position. Activator 14 and deactivator 16 provide an input to controller as to when the anti-theft position of the seat is desired, and when it is no longer desired, respectively. Activator 14 can take the form of a simple switch that is pushed by the vehicle operator upon exiting the vehicle. It would be preferable to use a deactivator 16 that is inaccessible or inoperable by an unauthorized user. For example, deactivator 16 could be a coded device.

Referring now to FIG. 2, activator 14 and deactivator 16 may take the form of a transmitter 32 and a receiver 34.

Transmitter 32 and receiver 34 may be of the type commonly used in a remote entry system to lock and unlock vehicle doors. Transmitter 32 has a push button 37 and an antenna 38. Upon pushing push button 36, a coded signal is transmitted via transmitter 38. Receiver 34 receives the coded signal via antenna 40 and provides this information to controller 10. Transmitter 32 preferably transmits an RF signal. However, several variations, such as infrared, are commonly known. In the case of a transmitter, both activator 14 and deactivator 16 may be incorporated into transmitter 32 to both activate and deactivate the anti-theft system. If controller 10 receives an activate signal from transmitter 36, controller 10 will move the seat into its anti-theft position. Upon receipt of a second coded signal, controller 10 will position the seat to a driveable position. Preferably, the driveable position is that where the vehicle operator previously left the seat before activating the anti-theft function. Controller 10 has a memory 31 to store the prior position of the seat prior to the anti-theft system activation.

Referring now to FIG. 3, a keypad 42 is shown. Keypad 42 may provide the activate and deactivate function. Using keypad 42 a secret code may be provided to controller 10 to activate and deactivate the anti-theft system.

Referring now to FIG. 4, a partial cutaway view of an automobile 44 is shown having an instrument panel 46, a steering wheel 48, and the driver seat 50. Driver seat 50 has a seat base 52, a seat back 54, and a headrest 56. A support 58 is connected to seat base 52. Support 58 is preferably attached to automotive vehicle 44 by way of a series of mounts 60, which will be further described in connection with FIGS. 6 and 7. As shown, driver seat 50 is in the aft position. That is, seat back 54 and seat base 52 are positioned in a driveable position away from steering wheel 48 and instrument panel 46.

Figure 5:
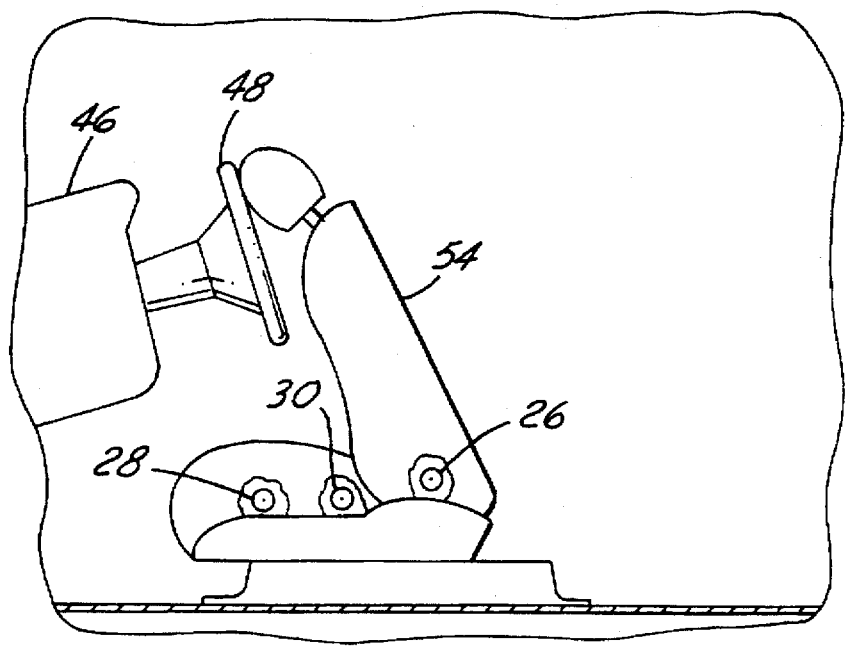
FIG. 5 is a seat having its seat back and seat base in the fore position.

Referring now to FIG. 5, driver seat 50 is shown in the anti-theft position. At a minimum, seat base 52 is positioned by seat base horizontal motor 28 in its forwardmost position, and seat back 54 is positioned by seat back motor 26 in its forwardmost position. The anti-theft position has seat base 52 as close to instrument panel 46 and seat back 54 as close to steering wheel 48 as possible. In addition, seat base 52 may also be positioned in its upmost position by seat base vertical motor 30. This further hinders an authorized user's access to the vehicle.

Figure 6:
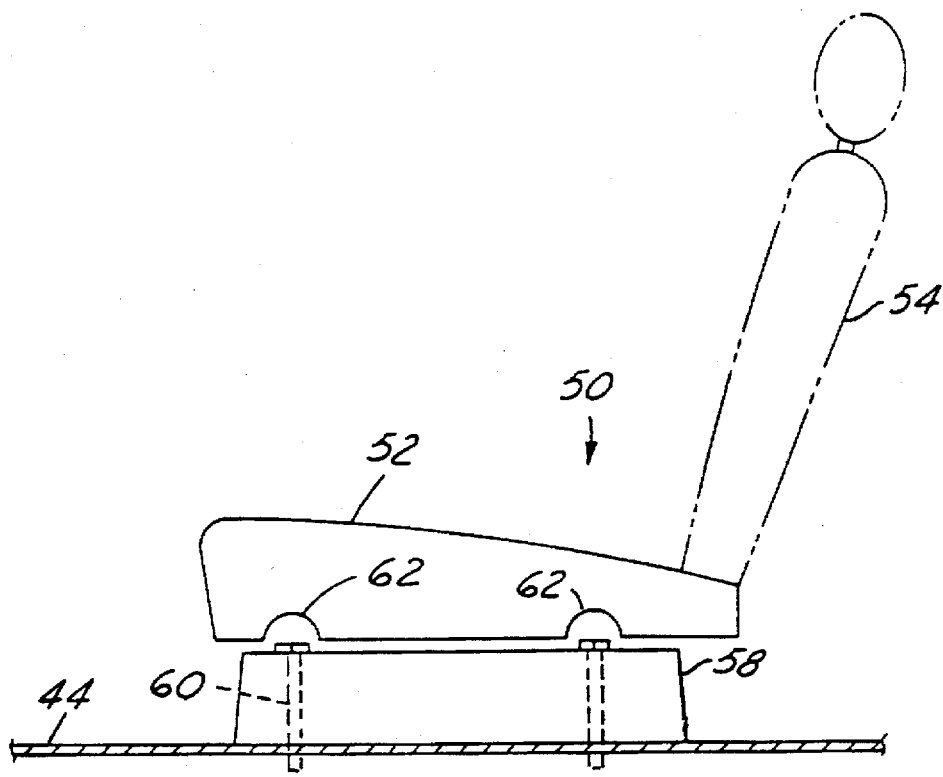
FIG. 6 is a side view of a seat in the aft position showing the seat mounts.

Referring now to FIG. 6, an enlarged view of the mounting of driver seat 50 is shown. Seat 50 is shown in an aft position. In the aft position, mounts 60 are preferably accessible to assemble and service seat 50. One method for implementing access to mount 60 is to provide an opening 62 on seat base 52 whereby a wrench or other mounting tool may be used to gain access to mounts 60.

Figure 7:
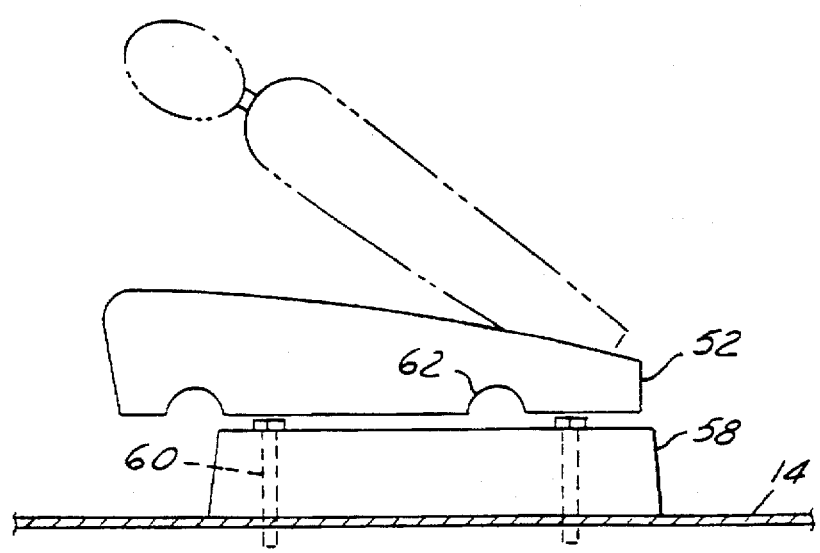
FIG. 7 is a side view of a seat in the fore position showing its seat mount.

Referring now to FIG. 7, seat 50 is shown in the anti-theft position. Openings 62 are moved forward to prevent access to at least one set of mounts 60. Several methods would be evident to those skilled in the art for preventing access to mounts 60 while vehicle is in the fore position.

In operation, the anti-theft system can operate in two ways; fully automatic and semi-automatically. In automatic, when the operator leaves the vehicle, the vehicle senses that the occupant has left the vehicle by way of the various inputs described above. If an occupant was detected by occupant sensor 22, or a key is detected in the ignition by key-in detector 20, or if the transmission is in any position other than "park" as detected by transmission detector 24, the anti-theft system would not be activated.

In semi-automatic operation, some minimal activation is required, such as locking the door via a transmitter, or pressing a switch. Occupant sensor 22, key-in ignition detector 20, transmission position detector 24, and door open sensor 18 may be used to prevent the seat from moving to the anti-theft position prematurely.

As would be evident to one skilled in the art, several modifications of the invention may be made while still being within the scope of the appended claims. For example, the activation of the system may be done in several ways.

What is claimed is:

1. An anti-theft device for an automotive vehicle comprising:

a seat having a seat back and a seat base, each of said seat back and said seat base having a respective fore and aft position;

a first motor operatively coupled to said seat back for moving said seat back between said fore and aft position;

a second motor operatively coupled to said seat base for moving said seat base between said fore and aft position;

an input device generating an activation signal;

a power source;

a controller connected to said first motor and said second motor and said input device, said controller upon receiving said activation signal connecting said power source to said first motor and second motor whereby said first motor moves said seat back to said fore position and said second motor moves said seat base to said fore position;

wherein said seat has mounting bolts mounting said seat to said automotive vehicle so that when said seat is in said aft position then said mounting bolts are accessible and when said seat is in said fore position then access to said mounting bolts is prevented.

2. An anti-theft device as recited in claim 1 wherein said input device is a key pad.

3. An anti-theft device as recited in claim 1 wherein said input device is a transmitter and a receiver.

4. An anti-theft device as recited in claim 1 wherein said seat base further having an up and down position, said anti-theft device further comprising a third motor operatively coupled to said seat base for moving said seat base between said up and down position.

5. An anti-theft device for an automotive vehicle comprising:

a seat having a seat back and a seat base, each of said seat back and said seat base having a respective fore and aft position;

a first motor operatively coupled to said seat back for moving said seat back between said fore and aft position;

a second motor operatively coupled to said seat base for moving said seat base between said fore and aft position;

an input device generating an activation signal;

a sensor generating an activation ready output signal;

a power source;

a controller connected to said first motor and said second motor, said input device and said sensor, said controller upon receiving said activation signal and said activation ready output signal connecting said power source to said first motor and second motor whereby said first motor moves said seat back to said fore position and said second motor moves said seat base to said fore position;

wherein said seat has mounting bolts mounting said seat to said automotive vehicle so that when said seat is in said aft position then said mounting bolts are accessible and when said seat is in said fore position then access to said mounting bolts is prevented.

6. An anti-theft device as recited in claim 5 wherein said input device is a switch.

7. An anti-theft device as recited in claim 5 wherein said input device is a key pad.

8. An anti-theft device as recited in claim 5 wherein said input device is a transmitter and a receiver.

9. An anti-theft device as recited in claim 5 wherein said sensor comprises a door open sensor generating a door closed signal and a door open signal and an occupant sensor generating an occupant and a no occupant signal, said activation ready output signal comprises a door closed signal, and a no occupant signal.

10. An anti-theft device as recited in claim 5 wherein said sensor comprises a key in ignition sensor generating a key in ignition signal and a no-key-in-ignition signal, said activation ready output signal comprises a no-key-in-ignition signal.

11. An anti-theft device as recited in claim 5 wherein said sensor comprises a transmission position detector signal generating a transmission-in-park signal and a transmission-not-in-park signal, said activation ready output signal comprise a transmission-in-park signal.

12. An anti-theft device as recited in claim 5 wherein said seat base having an up and down position, further comprising a third motor operatively coupled to said seat base for moving said seat base between said up and down position.

13. An anti-theft device for an automotive vehicle comprising:

a seat having a seat back and a seat base, each of said seat back and said seat base having a respective fore and aft position;

a first motor operatively coupled to said seat back for moving said seat back between said fore and aft position;

a second motor operatively coupled to said seat base for moving said seat base between said fore and aft position;

a plurality of sensors generating output signals indicative of activating said anti-theft device;

a power source;

a controller connected to said first motor and said second motor and said plurality of sensors, said controller upon receiving predetermined signals from said plurality of sensors connecting said power source to said first motor and second motor whereby said first motor moves said seat back to said fore position and said second motor moves said seat base to said fore position;

wherein said seat has mounting bolts mounting said seat to said automotive vehicle so that when said seat is in said aft position then said mounting bolts are accessible and when said seat is in said fore position then access to said mounting bolts is prevented.

14. An anti-theft device as recited in claim 13 wherein one of said plurality of sensors is a door open sensor generating a door closed signal and a door open signal and an occupant sensor generating an occupant and a no occupant signal, said predetermined signal is a door closed signal, and a no occupant signal.

15. An anti-theft device as recited in claim 13 wherein one of said plurality of sensors is a key in ignition sensor generating a key in ignition signal and a no-key-in-ignition signal, said predetermined signals further include a no-key-in-ignition signal.

16. An anti-theft device as recited in claim 13 wherein one of said plurality of sensors includes a transmission position detector signal generating a transmission-in-park signal and a transmission-not-in-park signal, said predetermined signals further include a transmission-in-park signal.

17. An anti-theft device as recited in claim 13 wherein said seat base having an up and down position, further comprising a third motor operatively coupled to said seat base for moving said seat base between said up and down position.

* * * * *